United States Patent Office 3,377,403
Patented Apr. 9, 1968

3,377,403
DEHYDROGENATION PROCESS
Laimonis Bajars, Princeton, N.J., assignor to Petro-Tex Chemical Corporation, Houston, Tex., a corporation of Texas
No Drawing. Continuation-in-part of application Ser. No. 72,327, Nov. 29, 1960. This application Nov. 8, 1962, Ser. No. 236,403
The portion of the term of the patent subsequent to Sept. 20, 1982, has been disclaimed
6 Claims. (Cl. 260—680)

This application is a continuation-in-part of my copending application Ser. No. 72,327, filed Nov. 29, 1960, which in turn was a continuation-in-part of my application Ser. No. 825,656, filed July 8, 1959, both of which are now abandoned.

This invention relates to a process for the production of diolefins by the dehydrogenation of aliphatic hydrocarbons.

One of the objects of this invention is to provide an improved commercial process for the preparation of butadiene. Butadiene is presently commercial produced by several processes. One of the standard commercial processes in the production of butadiene is the process for the dehydrogenation of butenes with a catalyst known as the Shell 205 catalyst. According to this process, butene may be converted in an amount of about 26 to 28 mol percent conversion per pass with a selectivity to butadiene of approximately 70 to 75 mol percent per pass, for a yield of about 18 to 21 mol percent per pass. It is desirable to produce butadiene at higher levels than the approximately 20 percent. Another commercial process is the one-step butane dehydrogenation process for the production of butadiene and butenes using a chromic oxide-alumina type catalyst. This process has been reported to produce only about 11 mol percent butadiene per pass. Furthermore, in the one-step process the catalyst becomes coated with coke and after a period of minutes must be regenerated by purging the catalyst bed followed by burning off the carbon. In addition to the expense of the apparatus necessary for the regenerating step and the cost of operation of the regenerating step, the process only produces butadiene during the portion of the cycle that is not being devoted to regeneration. Thus, the yield of butadiene on an hourly basis is considerably reduced, and consequently a greater number of reactors must be provided to produce a given quantity of butadiene per unit of time. A third process for the commercial production of butadiene is the process utilizing a calcium nickel phosphate catalyst to dehydrogenate butene to butadiene. Commercial yields are reported to be on the order of 39 mol percent per pass. Even though this process produces higher yields of butadiene per pass than the 205 catalyst it suffers from the same drawback as does the one-step process used in the chromic alumina catalyst. That is, the catalyst is not self-regenerating. Typically in this process using the calcium nickel phosphate catalyst, the process is on the dehydrogenating portion of the cycle only about one-half of the time. After a period of minutes on the dehydrogenation cycle the reactor must be purged, the valve changed and the catalyst regenerated by burning off the coke. Here again the yield of butadiene per reactor is correspondingly reduced because only during one-half of the time is butadiene being produced.

Another disadvantage of the commercial processes is that large quantities of heat must be supplied to the processes to provide the necessary heat for the endothermic dehydrogenation reaction.

It is accordingly an object of this invention to provide a process for the production of high yields of aliphatic diolefins. It is another object to provide a process which does not require regeneration of a catalyst, and is therefore a continuous process. It is also an object to provide a process which requires little or no energy input for the dehydrogenation reaction once reaction starts. Another object is to provide a process which is not as corrosive as some processes suggested in the prior art. Additional objects are to provide a process which results in high conversions, selectivities and yields of the desired product. Other objects and advantages will be apparent from the description and example which follows.

According to this invention, aliphatic hydrocarbons of from 4 to 6 carbon atoms may be dehydrogenated to olefins and/or diolefins containing the same number of carbon atoms as the feed by reacting at an elevated temperature a mixture in critical proportions of the hydrocarbon of 4 to 6 carbon atoms to be dehydrogenated, oxygen and iodine. It is a feature of this invention that the equivalent partial pressure of the hydrocarbon of 4 to 6 carbon atoms to be dehydrogenated be no greater than 6 inches of mercury absolute at a total pressure of one atmosphere.

The dehydrogenation of hydrocarbons to diolefins in the presence of oxygen and iodine has been previously suggested in the prior art. According to Mullineaux et al., U.S. 2,890,253, patented June 9, 1959, for example, butene may be dehydrogenated to butadiene. According to this patent, large quantities of iodine are required. Mullineaux et al. suggests that the amounts of iodine required may be reduced by adding oxygen to the process, however, the amount of oxygen used is required to be no greater than one mol of oxygen per atom of iodine present. In addition, the amount of iodine must still be present in an amount of at least 0.1 mol per mol of hydrocarbon to be dehydrogenated, and preferably is at least 0.2 mol of iodine per mol of the hydrocarbon. According to most of the examples, even higher ratios of iodine to hydrocarbon are utilized, such as 1.3 mols of iodine per mol of hydrocarbon to be dehydrogenated. The molecular weight of iodine is 254 and this means that in the dehydrogenation of butene with 1.3 mols of iodine, 330 pounds of iodine must be charged for each 56 pounds of butene. In drum size quantities the present cost of iodine is about two dollars per pound. Therefore, over six hundred dollars worth of iodine must be charged for each mol of butene, whereas the value of butadiene produced is only a relatively few cents per pound. Even though the iodine may be recycled in the process, the cost of the inventory of iodine required may become prohibitive. Furthermore, there is an inevitable amount of loss of iodine in the process, which loss is based on a percent of the amount of iodine present. Other disadvantages of the use of larger amounts of iodine are that large amounts of iodine and iodine compounds are quite corrosive and also cause polymer and tar formation in the apparatus for the recovery of the product.

It has been found according to the present invention that hydrocarbons of 4 to 6 carbon atoms may be dehydrogenated at high levels of conversions, selectivities and yields and less iodine may be used. It has been found that if the partial pressure of the hydrocarbon to be dehydrogenated is maintained at a level equivalent to no greater than 6 inches of mercury absolute at a total pressure of one atmosphere and at the same time the amount of oxygen is increased to at least 0.35 mol per mol of hydrocarbon, with a ratio of at least four mols of oxygen per mol of iodine, that the amount of iodine required may be reduced to only a fraction of that required according to Mullineaux et al. to produce a given yield of product. High yields of unsaturated hydrocarbon may be produced even with minor amounts of iodine less than one-tenth mol per mol of hydrocarbon to be dehydragenated. The consequent savings in the cost of iodine are apparent.

The partial pressure of the $C_4$–$C_6$ aliphatic hydrocarbon being dehydrogenated, the ratio of the mols of oxygen to the atoms of iodine and the ratio of the mols of oxygen per mol of hydrocarbon are all essential and interrelated critical features of this invention.

It was indeed surprising that the higher yields of product were obtained with the process of this invention. One surprising result was that higher yields were obtained when the partial pressure of the hydrocarbon to be dehydrogenated was maintained at no greater than 6 inches of mercury. As pointed out in the Mullineaux et. al patent, an increase in pressure shifts the equilibrium between hydrogen iodide and elemental iodine in favor of elemental iodine. If it is assumed as taught by Mullineaux et al. that the dehydrogenation process proceeds by the reaction of the hydrogen liberated from the hydrocarbon being dehydrogenated with iodine, then a decrease in pressure would be expected to reduce the amount of iodine present for reaction with the liberated hydrogen. Therefore, Mullineaux et al. preferred to operate with a positive pressure up to 75 pounds per square inch. Another surprising result of this invention was that high selectivities and yields of product were produced by this combination of reduced partial pressure of the hydrocarbon, together with large amounts of oxygen and small amounts of iodine. Mullineaux et al. taught that under his conditions if the oxygen were present in an amount of greater than one mol per atom of iodine that the hydrocarbon would be attacked to a substantial degree to form oxidation products. Thus, it would have been expected that with a large amount of oxygen present but only a small amount of iodine that the hydrocarbon would have been oxidized to such products as $CO$, $CO_2$, aldehydes and acids. Therefore, according to this invention it was found that when these process variables, each of which would have been expected to lower the selectivity and yield of product, were combined, the yield of product was actually increased to a marked degree rather than being decreased. By such a process high yields of product may be produced utilizing only small amounts of iodine. Whether the iodine is reacting as a reactant in the process or is functioning as a catalyst is not understood.

The partial pressure of the hydrocarbon to be dehydrogenated should be equivalent to no greater than 6 inches mercury absolute, or one-fifth atmosphere, when the total pressure is one atmosphere according to this invention. Also because the initial partial pressure of the hydrogen to be dehydrated is equivalent to no greater than 6 inches of mercury at a total pressure of one atmosphere, the combined partial pressure of the hydrocarbon to be dehydrogenated plus the dehydrogenated hydrocarbon will also be equivalent to no greater than 6 inches of mercury. For example, if butene is being dehydogenated to butadiene, at no time will the combined partial pressure of the butene and butadiene be greater than equivalent to 6 inches of mercury at a total pressure of one atmosphere. Preferably the hydrocarbon to be dehydrogenated should be maintained at a partial pressure equivalent to no greater than about 4 inches at a total pressure of one atmosphere. The desired partial pressure may be maintained by operating the process under a vacuum or by using diluents such as helium, organic compounds, nitrogen, steam, mixtures thereof, and the like, or by a combination of vacuum and diluents. Inert diluents are preferred. For convenience, equivalent partial pressures are calculated on a basis of a system that has a total pressure of one atmosphere at 25° C. For example, in a mixture of one mol butene, eight mols of steam and one mol of oxygen under total pressure of one atmosphere or approximately 30 inches of mercury the butene would have an absolute pressure of one-tenth of the total pressure, or a partial pressure of about three inches of mercury absolute. Equivalent to this three inches of mercury butene absolute pressure at atmospheric pressure would be a mixture of butene, oxygen and iodine under a vacuum such that partial pressure of the butene is three inches of mercury absolute. For the purpose of this invention, also equivalent to the three inches of mercury butene absolute pressure at atmospheric pressure would be the same mixture of one mol of butene, eight mols of steam and one mol of oxygen under a total pressure greater than atmospheric, for example, a total pressure of 15 or 20 inches mercury above atmospheric. Thus, when the total pressure on the reaction zone is greater than one atmosphere, the absolute values for the pressure of hydrocarbon to be dehydrogenated will be increased in direct proportion to the pressure above one atmosphere. Another feature of this invention is that the combined partial pressure of the hydrocarbon to be dehydrogenated plus the iodine liberating material will be equivalent to no greater than about 6 inches of mercury, and preferably no greater than about 4 inches of mercury, at a total pressure of one atmosphere. The lower limit of hydrocarbon partial pressure usually will be greater than about 0.1 inch mercury. Although the partial pressure of the hydrocarbon to be hydrogenated will be no greater than equivalent to 6 inches of mercury absolute at a total pressure of one atmosphere, the total pressure of the system normally will be from 8 to 10 inches of mercury absolute up to about atmospheric or greater, so long as the critical features of the invention are maintained.

The preferred diluent for the reaction is steam. The high yields of product obtained according to this invention are accomplished even when large amounts of steam are present. In fact, high ratios of steam based on the hydrocarbon to be dehydrogenated are preferred. In the present reaction the high yields in the presence of steam were particularly unpredictable. When steam is employed, the ratio of steam to hydrocarbon to be dehydrogenated will normally be greater than 2 or 3 mols of steam per mol of hydrocarbon and generally will be within the range of about 4 to 20 or 30 mols of steam per mol of hydrocarbon. The preferred range of steam concentration would be from about 6 to about 15 mols of steam per mol of hydrocarbon to be dehydrogenated.

The minimum amount of oxygen used will be at least 0.35 mol of oxygen per mol of hydrocarbon to be dehydrogenated, and the amount may be up to about 2 mols or more of oxygen per mol of hydrocarbon to be dehydrogenated. Better results are obtained if the amount of oxygen is maintained within the range of 0.4 to about 1.5, such as within the range of 0.5 to 1.25 mol of oxygen per mol of hydrocarbon to be dehydrogenated. Suitable ranges are such as 0.35 to 2.0, about 0.4 to 2.0, about 0.5 to 2.0 and about 0.5 to 1.5. A particularly useful range is between about 0.6 and about 1.0 mol of oxygen per mol of hydrocarbon to be dehydrogenated. Oxygen may be supplied to the reaction as pure oxygen or may be diluted with inert gases such as helium, carbon dioxide and nitrogen. Air is an excellent source of the oxygen.

The ratio of the oxygen to iodine will be at least 4 mols of oxygen per mol of iodine present, and preferably will be at least 5 mols of oxygen per mol of iodine present, such as at least 8 or 10 mols of oxygen per mol of iodine present. The upper limit of the ratio of oxygen to iodine may be as high as 500 or higher mols of oxygen per mol of iodine, but generally better results are obtained if the ratio is no greater than about 200 or 300 mols. Excellent results have been obtained at ratios of between 8 and 100 mols of oxygen per mol of iodine. Thus, suitable ranges of the ratio of the mols of oxygen per mol of iodine are such as at least 4.0 to about 500, about 5 to 300, 5 to 200, at least 5 to about 100, 8 to 200, 8 to 100, and 10 to 100.

Amounts of iodine as small as 0.001 or less mol of iodine per mol of hydrocarbon to be dehydrogenated have been found to be effective in the process of this invention. The iodine concentration normally will be present in an amount of at least about 0.005 mol of iodine per mol of hydrocarbon to be dehydrogenated. Iodine may be employed in total amounts such as from 0.001 or 0.005 to 0.06 or 0.09 mol of iodine per mol of hydrocarbon to be dehydrogenated, and generally will be between about 0.01 to 0.06 mol of iodine per mol of hydrocarbon to be dehydrogenated. The preferred ratio is between 0.015 or 0.020 up to 0.05 mol of iodine per mol of hydrocarbon to be dehydrogenated. The iodine will generally be less than 10 mol percent of the total feed to the reactor and ordinarily will be less than 5 mol percent of the total.

In general, any iodine or iodine compound may be used which under the conditions of reaction will result in at least equivalent to 0.001 mol or 0.002 atom, of iodine or the equivalent amount of hydrogen iodide being present in the vapor phase per mol of hydrocarbon to be dehydrogenated. The temperature of the dehydrogenation reaction may be either above or below the boiling point of the volatile iodine compound being fed. In the specification and in the claims when reference is made to a certain percentage of the iodine being in the vapor state, this is applicable regardless of whether the iodine was derived such as by boiling, decomposition or sublimation. It is understood that when mols of iodine are referred to, both in the specification and in the claims, that this phrase is used as an expression of the equivalent quantity of iodine present and not an expression that the iodine is in molecular or elemental form. Thus, two mols of HI, for purposes of calculation, would be equivalent to one mol of molecular or elemental $I_2$, as the same quantity of atoms of iodine would be present in the vapor phase in both instances. Alternatively, the quantity of iodine could be expressed in terms of twice the number of atoms of iodine designated.

Iodine employed in the process of this invention may be obtained from any iodine liberating compound such as molecular or elemental iodine, hydrogen iodide, organic iodides, such as alkyl iodides of from 1 to 6 carbon atoms and the like. The iodine liberating compound must be decomposed or volatilized under the reaction conditions to provide the specified amount of free iodine or hydrogen iodide. Suitable iodine liberating compounds include molecular iodine; hydrogen iodide; aliphatic iodides of from 1 to 6 carbon atoms including methyl iodide, ethyl iodide, propyl iodide, isopropyl iodide, n-butyl iodide and its isomers, n-amyl iodide and its isomers, n-hexyl iodide and its isomers, 1,2-diiodoethane and allyl iodide; cycloaliphatic iodides such as cyclohexyl iodide; aromatic iodides such as 1,2-diiodobenzene, phenyl iodide and benzyl iodide; iodohydrins such as ethylene iodohydrin; iodo substituted aliphatic acids such as iodo acetic acid; organic amine iodide salts of the general formula $R_3N \cdot HI$ wherein R is a hydrocarbon radical containing from 0 to 8 carbon atoms, such as methyl amine hydroiodide; volatile metal iodides such as $ZnI_2$ and $AlI_3$; volatile metalloid iodides such as As $I_3$; other iodine compounds such as volatile inorganic iodides as $SiI_4$, $SI_6$, $SOI_2$, $IHSO_2$, $IO_2$, $I_2O_5$, $CI_4$, and the like. The preferred sources of iodine are elemental iodine, hydrogen iodide and mixtures thereof. It is an advantage of this invention that hydrogen iodide leaving the reactor may be recycled to the stream entering the dehydrogenation zone without the necessity of processing or converting it to another form.

The $C_4$ to $C_6$ aliphatic hydrocarbon to be dehydrogenated will be compounds such as butene-1, butene-2, n-butane, 2-methylbutene-1, 2-methylbutene-2, 2-methylbutene-3, n-pentane, 2-methylbutane, n-hexane, n-hexene-1, 2-methylpentene-1, 2-methylpentene-2, 2-methylpentene-3, and mixtures thereof, such as mixtures of butene-1 and/or butene-2 with n-butane. The especially desirable feeds are those of 4 to 5 carbon atoms having a straight carbon chain of at least 4 carbon atoms, such as butene-1, butene-2, 2-methylpentene-2 and mixtures thereof. A desirable feedstock is one containing at least about 50 or 75 mol percent, of $C_4$ to $C_5$ aliphatic hydrocarbon based on the total weight of organic feed to the reactor. The process is particularly effective in dehydrogenating aliphatic hydrocarbons to provide a product wherein the major unsaturated product has the same number of carbon atoms as the feed hydrocarbon. Thus, butane, butene-1, butene-2 or mixtures thereof may be dehydrogenated to butadiene and/or vinyl acetylene; butadiene-1,3 may be dehydrogenated to vinyl acetylene and butane may be dehydrogenated to butene.

The temperature of reaction will be at least 400° C. and normally will be at least about 450° C. The maximum temperature in the reactor may be as high as 1000° C. or higher but the preferred range of maximum temperatures in the reaction zone will be from about 450° C. to 900° C., and generally the maximum temperature in the reaction zone will be between 450° C. and 800 or 850° C.

The residence time of the reactants in the reaction zone will usually be within the range of from 0.01 second to 5 or 10 seconds, although lower contact times down to 0.001 second and longer times up to 3 minutes may also be employed. The reaction zone is defined as that portion of the reactor which is at a temperature of at least 400° C. Residence time is the calculated dwell time of the reactants in the reaction zone assuming the mols of product mixture is equivalent to the mols of feed mixture. In terms of space velocity the flow rate of the hydrocarbon to be dehydrogenated will generally be within the range of from 0.1 to 20.0 liquid hourly space velocities (LHSV) such as between 0.25 and 10.0 LHSV. The LHSV is defined as the flow rate of the hydrocarbon to be dehydrogenated, calculated as liquid volumes of hydrocarbon to be dehydrogenated at 25° C. and standard pressure of 760 mm. of mercury per volume of reaction zone per hour. The reaction zone is defined as the area which is at a temperature of at least 450° C.

A variety of techniques may be employed to mix the iodine or iodine compound, hydrocarbon, oxygen-containing gas and steam, if employed. The hydrocarbon may be preheated and mixed with steam and preheated oxygen of air and the iodine or iodine compound such as hydrogen iodide mixed therewith prior to passing the stream in vapor phase through the reaction zone. Hydrogen iodide or a source of iodine may be mixed with steam or air prior to reaction. Any of the reactants may be split and added incrementally. For example, part of the iodine may be mixed with the hydrocarbon to be dehydrogenated and the oxygen. The mixture may then be heated to effect some dehydrogenation and thereafter the remainder of the iodine added to effect further dehydrogenation. The reactor may be of any type. Conventional reactors used for the preparation of unsaturated hydrocarbons are satisfactory and the reactor may be packed or unpacked. The effluent reaction product from the reactor is cooled and then passed to means for removing iodine such as in a caustic scrubber. The hydrocarbon product is then suitably purified as by fractionation to obtain the desired high purity unsaturated product.

In the following examples will be found specific embodiments of the invention and details employed in the practice of the invention. Percent conversion refers to the mols of olefin consumed per 100 mols of olefin fed to the reactor. Percent selectivity refers to the mols of diolefin formed per 100 mols of olefin consumed and percent yield refers to the mols of diolefin of the same number of carbon atoms formed per mol of olefin fed. All quantities of iodine expressed are calculated as mols of $I_2$. The temperatures of reaction are the maximum temperatures recorded in the reaction zone. These examples are intended as illustrative, since numerous modifications and variations in accordance with the disclosure herein will be apparent to those skilled in the art.

Examples 1 and 2

Examples 1 and 2 were made in a quartz reactor which was .235 inch internal diameter with the outside diameter being 5/16 inch. The length of the reactor was 10.6 feet and the internal capacity was 90 cc. The feed streams to the reactor were preheated before entering the reactor. The reactor was encompassed by an electric heating furnace to maintain the reactor temperature. Separate feeds of the water and hydrocarbon were used. A carburetor inserted between the reactor and the preheater split the steam into approximately equal portions and the hydrocarbon was inserted into one of the proportions and the oxygen into the other, then both streams were mixed and passed into the reactor. The iodine was added as 1-iodo-3-methyl butane. A glass take-off with nitrogen injection was used to prevent hydrocarbon condensation and this was followed by a cold finger condenser to remove tars, iodine and water. The analysis of the product was made with a gas chromatograph. The flow rates were calculated based on the volume of the 90 cc. reactor space. The flow rate of 2-methyl butene-2 was ½ liquid volume of 2-methyl butene-2, calculated at 25° C. and 760 mm. of mercury, per volume of reactor per hour (LHSV). The mol ratio of oxygen to butene was 1/1, the mol ratio of 2-methyl butene-2 to 1-iodo-3-methyl butane was equivalent to one mol of 2-methyl butene-2 to 0.04 mol of iodine ($I_2$), and the steam to 2-methyl butene-2 ratio is set forth in the table below. The 2-methyl butene-2 was converted to isoprene at the indicated conversion, selectivity, and yield as mol percent per pass and in these examples only one pass was made in each case in each run.

| Temp., ° C. | Mols steam per mol 2-methyl butene-2 | Conversion | Selectivity | Yield |
|---|---|---|---|---|
| 550 | 5 | 45 | 80 | 36 |
| 675 | 20 | 46 | 76 | 35 |

Example 3

A ¾ inch Vycor * reactor which was 18 inches long, containing a ¼ inch thermowell, was filled with Size 6 mesh quartz chips and placed inside an electric furnace. A mixture of butene-2, air, hydrogen iodide, and steam was fed to this reactor at a temperature of about 400° C. and a flow rate of about 1 LHSV of butene-2. The reaction mixture contained 14.6 mols of steam per mol of butene, 0.8 mol of oxygen (as air) per mol of butene, and the equivalent of 0.04 mol of iodine ($I_2$). When this mixture was passed into the reactor at 400° C. an exothermic reaction began and the hot spot in the quartz bed was recorded as 750° C. Effluent from this reactor was analyzed and the yield of butadiene-1,3 obtained was 41 mol percent at a conversion of 55 percent and selectivity of 74.5.

Example 4

In a Vycor reactor having a bed temperature of 500° C. to 550° C., 2-methyl butene-2 was passed over clean Vycor Raschig rings at a flow rate of ½ liquid v./v./hr., (LHSV), with 0.75 mol of oxygen and 0.04 mol of iodine per mol of 2-methyl butene-2, and 20 mols of steam per mol of 2-methyl butene-2. The 2-methyl butene-2 was converted to isoprene at a selectivity of 94.8 percent.

I claim:

1. The method for dehydrogenating aliphatic hydrocarbons of 4 to 5 carbon atoms which comprises contacting in the vapor phase at a temperature in the range of about 450° C. to 900° C. the said aliphatic hydrocarbon with oxygen in a molar ratio of about 0.5 to about 1.5 mol of oxygen per mol of said aliphatic hydrocarbon, iodine in a molar ratio of between 0.005 to 0.09 mol of iodine per mol of said aliphatic hydrocarbon, and 2 to 30 mols of steam per mol of said hydrocarbon the partial pressure of said aliphatic hydrocarbon being no greater than equivalent to 5 inches of mercury at a total pressure of one atmosphere, and the ratio of the mols of oxygen to the mols of iodine being at least about eight.

2. The method for preparing isoprene which comprises reacting in the vapor phase at a temperature in the range of about 450° C. to 800° C. methylbutene with oxygen in a molar ratio of about 0.5 to about 1.5 mol of oxygen per mol of methylbutene, iodine in a molar ratio of 0.015 to 0.05 mol of iodine per mol of methylbutene and steam in a molar ratio of about 5 to 20 mols of steam per mol of methylbutene, and the ratio of the mols of oxygen to the mols of iodine being at least five.

3. The method for preparing butadiene-1,3 which comprises reacting in the vapor phase at a temperature in the range of about 450° C. to 800° C. butene with oxygen in a molar ratio of about 0.5 to about 1.5 mol of oxygen per mol of butene, iodine in a molar ratio of about 0.015 to 0.05 mol of iodine per mol of butene and steam in a molar ratio of about 5 to 20 mols of steam per mol of butene, and the ratio of the mols of oxygen to the mols of iodine being at least five.

4. In a process for preparing aliphatic diolefins which comprises heating at an elevated temperature a mono-olefinic hydrocarbon containing 4 to 6 carbon atoms with oxygen and iodine the improvement which comprises conducting the reaction with at least 0.40 mol of oxygen and greater than 0.015 mol of iodine per mol of mono-olefin, the mono-olefin being maintained at a partial pressure of equivalent to less than 6 inches mercury absolute at a total pressure of one atmosphere with steam, and the ratio of the mols of oxygen per mol of iodine being at least five.

5. In a process for preparing aliphatic diolefins which comprises heating at a temperature of at least about 450° C. a mono-olefinic hydrocarbon containing 4 to 5 carbon atoms with oxygen and iodine, the improvement which comprises conducting the reaction with at least 0.4 to about two mols of oxygen per mol of mono-olefin, greater than 0.001 mol of iodine per mol of mono-olefin and greater than two mols of steam per mol of mono-olefinic hydrocarbon, the ratio of the mols of oxygen to the mols of iodine being at least five.

6. The method for preparing butadiene-1,3 which comprises reacting in the vapor phase at a temperature in the range of about 450° C. to 800° C. butene with oxygen in a molar ratio of about 0.5 to about 1.5 mol of oxygen per mol of butene, iodine in a molar ratio of about 0.015 to 0.09 mol of iodine per mol of butene and steam in a molar ratio of about 5 to 20 mols of steam per mol of butene, and the ratio of the mols of oxygen to the mols of iodine being at least eight.

References Cited

UNITED STATES PATENTS

| | | | |
|---|---|---|---|
| 2,326,256 | 8/1943 | Schmidt et al. | 260—680 |
| 2,719,171 | 9/1955 | Kalb | 260—680 |
| 2,890,253 | 6/1959 | Mullineaux et al. | 260—683.3 |
| 2,921,101 | 1/1960 | Magovern | 260—683.3 |
| 2,945,900 | 7/1960 | Alexander et al. | 260—680 |

PAUL M. COUGHLAN, JR., *Primary Examiner.*

ALPHONSO D. SULLIVAN, *Examiner.*

---

* Vycor is the trade name of Corning Glass Works, Corning, N.Y., and is composed of approximately 96 percent silica with the remainder being essentially $B_2O_3$.